US012668376B2

(12) United States Patent

Belsbois et al.

(10) Patent No.: US 12,668,376 B2

(45) Date of Patent: Jun. 30, 2026

(54) METHOD OF APPLYING ICE REMOVAL FLUID TO A FOLDING WING AIRCRAFT AND METHOD OF OPERATING A FOLDING WING AIRCRAFT

(71) Applicant: Airbus Operations Limited, Bristol (GB)

(72) Inventors: Olivier Belsbois, Bristol (GB); Keith Agmen, Bristol (GB); Timothy Clark, Bristol (GB)

(73) Assignee: Airbus Limited Operations, Bristol (GB)

( * ) Notice: Subject to any disclaimer, the term of this patent is extended or adjusted under 35 U.S.C. 154(b) by 0 days.

(21) Appl. No.: 19/272,209

(22) Filed: Jul. 17, 2025

(65) Prior Publication Data

US 2026/0021906 A1     Jan. 22, 2026

(51) Int. Cl.
B64F 5/23 (2017.01)
B64C 3/56 (2006.01)

(52) U.S. Cl.
CPC . B64F 5/23 (2017.01); B64C 3/56 (2013.01)

(58) Field of Classification Search
CPC ..... B64F 5/23; B64F 5/20; B64C 3/56; B64D 15/10
See application file for complete search history.

(56) References Cited

U.S. PATENT DOCUMENTS

| | | | | | |
|---|---|---|---|---|---|
| 3,533,395 | A | * | 10/1970 | Yaste | B64F 5/23 |
| | | | | | 126/271.1 |
| 5,318,254 | A | * | 6/1994 | Shaw | B64F 5/23 |
| | | | | | 239/281 |
| 5,354,014 | A | * | 10/1994 | Anderson | B64F 5/20 |
| | | | | | 134/123 |
| 2015/0298826 | A1 | * | 10/2015 | Luca | B05B 13/005 |
| | | | | | 244/134 R |
| 2021/0362882 | A1 | * | 11/2021 | Mæland | G01B 11/002 |

FOREIGN PATENT DOCUMENTS

| | | | | | |
|---|---|---|---|---|---|
| CN | 106477052 | A | * | 3/2017 | B64F 5/23 |
| CN | 107804475 | A | | 3/2018 | |
| EP | 3301029 | A1 | * | 4/2018 | B64F 5/23 |
| SE | 8401318 | A | * | 1/1987 | |
| WO | 2008123807 | A1 | | 10/2008 | |

OTHER PUBLICATIONS

PN Reference (Year: 1987).*
Combined Search and Examination Report to GB2410679.1, dated Nov. 12, 2024, 6 pages.

* cited by examiner

*Primary Examiner* — Justin M Benedik
(74) *Attorney, Agent, or Firm* — Sterne, Kessler, Goldstein & Fox P.L.L.C.

(57)     ABSTRACT

A method of applying an ice-removal fluid (113) to a folding wing aircraft (100) is described, the method comprising applying the ice-removal fluid (113) to the folding wing portion (103) and holding the folding wing portion in an over-folded position (111) once the ice-removal fluid (113) has been applied. A method of operating an aircraft (100) during ground based operations is further described using the method of applying an ice-removal fluid (113).

8 Claims, 2 Drawing Sheets

Span (b) unfolded

Span (b') folded

METHOD OF APPLYING ICE REMOVAL FLUID TO A FOLDING WING AIRCRAFT AND METHOD OF OPERATING A FOLDING WING AIRCRAFT

TECHNICAL FIELD

The present invention relates to a method of applying ice removal fluid to a folding wing portion of a folding wing aircraft and a method of operating said aircraft.

BACKGROUND

Aircraft ground operations in known or predicted icing conditions must ensure that at the end of the take-off roll there is no frozen moisture contamination on an aircraft's critical surfaces (such as aerodynamic surfaces, sensor probes, intakes etc) or that the amount of contamination on the surface(s) is within allowable limits specified by the manufacturer. Such contamination is usually in the form ice, snow or frost accumulations or accretions. This ensures that the performance of the aircraft is as intended. Examples of such aerodynamic surfaces include the upper aircraft wing surfaces, engine nacelles, horizontal and vertical tail surfaces. Any excess ice contamination must therefore be removed, and steps must also be taken to prevent any further ice from building up again prior to the aircraft getting airborne. The removal of ice contamination from the surfaces is typically referred to as de-icing whereas the prevention of surface contamination from existing on the surfaces at the time of aircraft dispatch is referred to as anti-icing.

Ground based deicing and anti-icing are achieved by spray application of ice removal fluids to the aircraft surfaces while the aircraft is on ground. This is normally achieved using mobile spraying devices that are operated around the aircraft while it is parked at an airport aircraft stand or other off-stand operating locations. Commercially available ice removal fluids certified for aircraft ground operations come in different standardised types, which may differ in viscosity and compositions to make each type suited to either removal deicing or for anti-icing, or both. Types of ice removal fluid more suited to deicing are commonly referred to as deicing fluids that are normally applied heated, and are designed to melt the ice formations, and then dilute and lower the freezing temperature of the melted precipitates in order to 'clean' the aircraft. This is normally followed by an application of anti-icing fluids, which are ice removal fluids in the form of a thickened fluid that is designed to adhere to the aircraft surfaces, forming a protective layer that further dilutes and lowers the freezing temperature of any new precipitates, therefore protecting the surface from refreezing.

Ice removal fluids gradually lose their effectiveness at preventing ice contamination once they are applied to an aircraft surface. There is a predetermined length of time after the application (known as the "holdover time"), after which fresh ice-removal fluid must be re-applied to ensure the aircraft surfaces remain sufficiently ice-free until either the aircraft departs, or re-application of ice-removal fluid is required. The holdover time is affected by a number of factors including (i) the prevailing atmospheric and operational conditions, including wind speed, temperature and precipitation rates, (ii) the type of ice removal fluid used and its viscosity and water content, and (iii) 'run-off' or draining of the fluid, which is the flow of the applied ice removal fluid along and away from the surface to which it has been applied due to gravity force acting on the fluid. The amount of run-off is predominantly affected by the composition and viscosity of the applied ice removal fluid, and the inclination of the surface itself. 'Run-off' is a dominant factor reducing an applied fluid's holdover time where the fluid is applied to a highly inclined aircraft surface.

Ground operations of commercial passenger or cargo aircraft that have folding wing tips poses a unique challenge to aircraft manufacturers and operators alike. This is due to the fact that such aircraft must move and park on ground for extended periods of time with the folding wing tips in a retracted position in order to decrease their apparent span and operate within existing airport infrastructure such as taxiways, aprons and aircraft stands. Folding wing tips in retracted position are highly inclined and hence the holdover time for ice removal fluid applied to folding wing tip surfaces is negatively affected due to the factors previously mentioned.

Aircraft manufacturers have until now mitigated this challenge in a number of ways. The aircraft manufacturer may for example design the overall wing such that any ice accumulation present on the folding wing portion has no unacceptable impact on the required aircraft performance and handling. This may be achieved by limiting the overall surface area of the folding wing tip portion compared to the rest of the fixed wing or by increasing the effectiveness of the control surfaces such as ailerons to counteract any asymmetry in performance. An aircraft with such a design may be suboptimal as a result due to increases in the wetted area and weight resulting in increased operating cost to the operator.

In another alternative, the aircraft manufacturer may specify that the aircraft operator should apply additional ice removal fluids to the folding wings at shorter intervals when they are extended ('unfolded'). This directly increases costs of operation. Furthermore, if the aircraft is positioned off-stand (i.e. not at the aircraft stand) at a taxiway, or at an ice removal facility or a remote facility (if available), it will require the aircraft to first taxi to a remote location for ice-removal and locating ice removal equipment remote from the gate, which complicates the aircraft operations on ground and leads to higher costs to the operator and to the airport in order to provide such facilities.

In another alternative, the aircraft manufacturer may specify that higher viscosity fluids should be applied to retracted folding wing tips so that the fluid 'run-off' is reduced as much as possible in order to prolong the hold-over time. For example, the manufacturer may specify less diluted forms of type II or type IV fluids instead, such fluids being known to the skilled person. The use of higher viscosity less diluted fluids in these areas is however not optimum. Run-off still occurs and impacts holdover time in these areas compared to other less inclined surfaces such as the wing upper surfaces. This then necessitates further re-application of ice removal fluids for the folding wing portion, which is an additional operational cost both in terms of labour, use of equipment and ice removal fluid. It also may cause further delays in aircraft departure. In addition, higher viscosity ice removal fluids tend to be more costly to the operator.

It is therefore desirable to optimise the use of ice-removal fluids during ground operation of folding wing aircraft.

SUMMARY

A first aspect of the present invention provides a method of applying an ice-removal fluid to one or more wings of a folding wing aircraft, the method comprising applying the ice-removal fluid to the folding wing portion of the wing, and holding the folding wing portion in an over-folded position relative to the fixed wing portion once the ice-removal fluid has been applied such that run-off of the ice-removal fluid is reduced thereby increasing hold-over time.

With the folding wing portion in the overfolded position, the body gravity force vector acting on the ice removal fluid is lower than were the fluid to be applied to a more vertically inclined surface. Hence, the step of overfolding the folding wing portion reduces the folding wing portion surface inclination and minimises run-off of the ice-removal fluid from the surface thereby increasing holdover time of the applied fluid as a result. Overfolding in this way also serves to protect applied fluid adhered to the surface from external atmospheric conditions such as wind forces from blowing the ice removal fluid and promoting it to flow from the surface, which may further extend the holdover time. Lastly, with the folding wing portion in the overfolded position, the wing surface to which the ice removal fluid is applied is less exposed to precipitation contamination that would otherwise further serve to dilute the applied ice removal fluid and raise its freezing temperature, thereby extending the holdover time further.

The step of applying ice-removal fluid may be carried out when the folding wing portion is positioned in an unfolded position with the folding wing portion being moved to the overfolded position once the ice removal fluid is applied. This way may allow for a more uniform layer of ice-removal fluid to be applied to the folding wing portion prior to overfolding the folding wing portion relative to the fixed wing portion.

The step of applying ice-removal fluid may alternatively be carried out when the folding wing portion is positioned in an overfolded position. This way may enhance the adherence of the ice-removal fluid to be applied to the folding wing portion in adverse atmospheric conditions (e.g high winds, or during high precipitation).

The step of applying ice-removal fluid may alternatively be carried out when the folding wing portion is positioned between a fully unfolded position and an overfolded position. This way may enable ice-removal fluid to be applied to the folding wing portion with the wing span reduced sufficiently to enable the aircraft to be parked at an aircraft stand, but with the folding wing tip portion not yet fully folded to the overfolded position.

The overfolded position may be given when the upper surface of the folding wing portion and the horizontal axis forms an angle that is greater than or equal 95 degrees, and more preferably 135 degrees. The ice-removal fluid may preferably be a Type II or Type IV ice removal fluid.

A further aspect of the present invention provides a method of operating an aircraft during ground based operations comprising the steps of positioning the aircraft at an off-stand location (an area not at the aircraft stand e.g on a taxiway taxiing to or from the aircraft stand, or at another remote facility such as an ice removal facility) and applying an ice-removal fluid to a folding wing portion of the aircraft in accordance with any method so far described, and then positioning the aircraft in at the aircraft stand once the ice removal fluid has been applied. Operating the aircraft in this way may be preferable where freezing precipitation is expected to appear and adhere to the aircraft prior to the aircraft being dispatched from the aircraft stand and a short turnaround is required.

Yet a further aspect of the present invention provides a method of operating an aircraft during ground based operations comprising the steps of positioning the aircraft at an aircraft stand and applying an ice-removal fluid to a folding wing portion of the aircraft in accordance with any method so far described, and then positioning the aircraft at an off stand area once the ice removal fluid has been applied. Operating the aircraft in this way may be preferable where freezing precipitation is expected to appear and adhere to the aircraft prior to the aircraft being dispatched from the aircraft stand and a short turnaround is required. It may also be desirable when the aircraft is expected to be parked on stand for prolonged periods of time in freezing conditions because it will minimise ice accumulation prior to dispatch or make subsequent ice removal easier.

BRIEF DESCRIPTION OF THE DRAWINGS

Embodiments of the invention will now be described, by way of example only, with reference to the accompanying drawings, in which.

DETAILED DESCRIPTION

Figure 1:
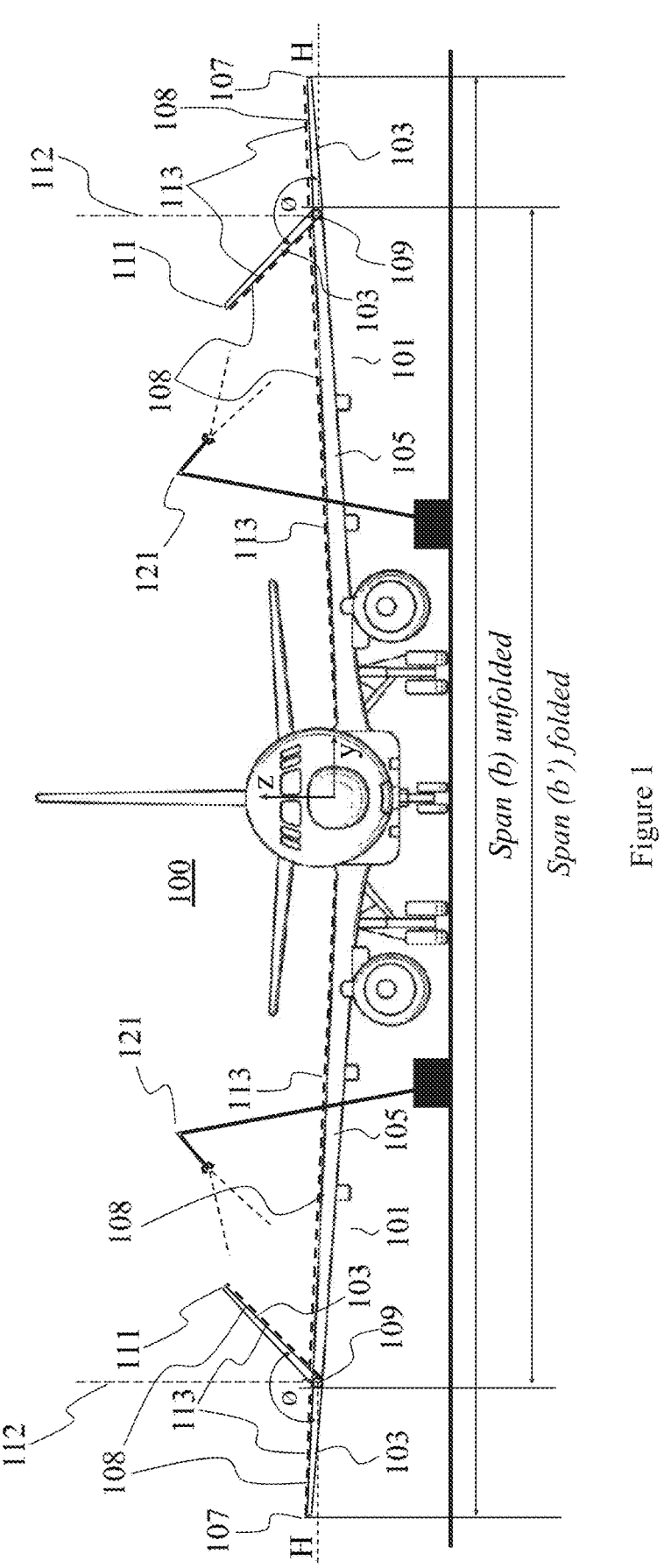
FIG. 1 is frontal projection view of folding wing aircraft (100) on ground undergoing ice-removal according to embodiments of the present invention.

FIG. 1 shows a folding wing aircraft (100) that is parked on ground and comprising a pair of wings (101) each provided with a folding wing portion (103) pivotally attached at a hinge (109) to a fixed wing portion (105). The position of the folding wing portion (103) relative to fixed wing portion (105) is controllable and can be selectively changed by the pilot using an onboard aircraft wing folding system (not shown) between at least a fully unfolded position (107) and an overfolded position (111).

The maximum wing span (b) of the aircraft (100) is achieved when the folding wing portion (103) is in the unfolded position (107) and the minimum wingspan (b') of the aircraft (100) is achieved when the folding wing portion (103) is in the overfolded position (111). The maximum wing span (b) is required to achieve the required aerodynamic performance of the aircraft (100) in flight. The minimum span (b') is required so that the aircraft (100) can operate within the aircraft size limits that are specified for aircraft taxiways and aircraft stands at airports.

A method of applying an ice-removal fluid (113) to one or more wings (101) of the folding wing aircraft (100) is shown in FIG. 1 wherein Type 2 ice removal fluid (113) is sprayed by a mobile spraying device (121) onto upper surfaces (108) of each wing (101), including both the folding wing portions (103) and both fixed wing portions (105).

In a first embodiment, the fluid (113) is shown sprayed onto the folding wing portion (103) when it is in an unfolded position (107). In a second embodiment, the fluid (113) is shown sprayed onto the folding wing portion (103) when the folding wing portion (103) is in an over-folded position (111) relative to the fixed wing portion (105). In both embodiments, the folding wing portion (103) is moved or held, as shown, in an over-folded position (111) with the ice-removal fluid (113) applied, such that run-off of the ice-removal fluid is reduced, thereby increasing hold-over time.

The overfolded position (111) in the above mentioned embodiments is present when the upper surface (108) of the folding wing portion (103) and the horizontal axis H form an angle Ø of 135 degrees, as shown. It should be appreciated that it may be present at any measured angle Ø greater than or equal to 95 degrees that achieves a reduction in run-off of an applied ice removal fluid (113). The horizontal axis H is an axis that is parallel to the aircraft spanwise axis y.

It should also be appreciated that one or more additional folding wing portion positions may be selectable by the pilot and actuated by the wing fold system between the fully unfolded position (107) and overfolded position (111). For example, an additional vertical position (112) may be selectable to ensure the aircraft (100) can fit within a desired aircraft stand span limitation, but without moving the folding wing tip portion (103) to an overfolded state. The vertical position (112) shown in the present embodiment is present when the upper surface (108) of the folding wing portion (103) and the horizontal axis H form an angle Ø of 90 degrees, as shown.

Normally both wings (101) are sprayed, as shown in the present example, however the circumstances may necessitate only a single wing (101) being treated in which case the same method shall apply. It should also be appreciated that the ice-removal fluid (113) may be any diluted or undiluted type of deicing or anti icing fluid known to the operator such as Type II, Type III or Type IV fluid, or their equivalents.

Figure 2:
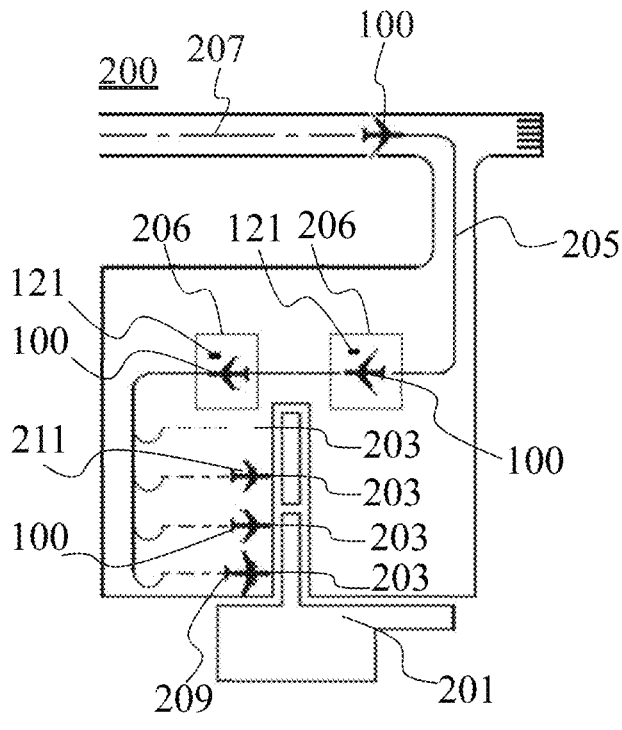
FIG. 2 is a schematic plan view of an exemplary ground operation of an aircraft (100) at an airport (200) according to a further embodiment of the present invention.

FIG. 2 depicts an exemplary airport (200) comprising an airport terminal building (201) provided with a plurality of aircraft stands (203). Each stand (203) further comprises a lead-in taxiway that joins a main taxiway (205) that leads to and from the airport runway (207). As can be seen, the folding wing aircraft (100) so far described is seen operating at an aircraft stand (203), and at various positions on the taxiway (205) taxiing towards the aircraft stand (203). Additional aircraft (209, 211) that are conventional non-folding wing aircraft are also shown parked at stands (203), adjacent to the folding wing aircraft (100).

In addition a pair of off-stand ice removal facilities (206) are shown, where the methods of applying ice removal fluid (113) so far described may be carried out by mobile spraying devices (121) either when the folding wing portion (103) is in the unfolded position (107) or in the overfolded position (111), when the aircraft (100) is either on the taxiway (205) taxiing to or from the runway (207), or when the aircraft (100) is on the taxiway (205) taxiing to or from an aircraft stand (203), where the separation distance from the aircraft (100) to surrounding obstacles may be reduced.

Either method of operating the aircraft (100) ensures that the ice removal fluid (113) is applied and that the folding wing portion (103) is subsequently moved to or held in an overfolded position (111) such that holdover time is extended while the aircraft (100) is at the aircraft stand (203), or while it is taxiing to the runway (207), which may be advantageous for the reasons previously described in the summary of invention.

Figure 3:
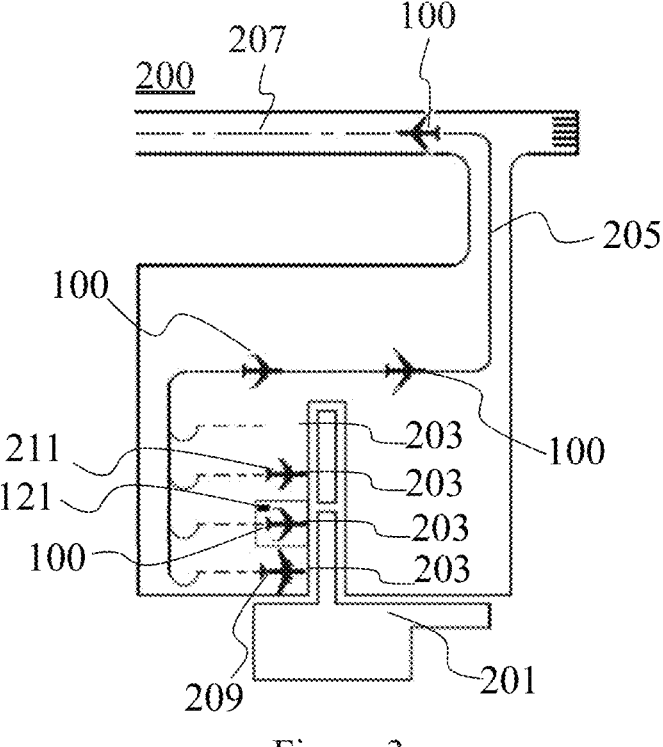
FIG. 3 is a further plan view of an exemplary ground operation of an aircraft (100) at the airport (200) according to yet a further embodiment of the present invention.

FIG. 3 depicts the same exemplary airport (200) as FIG. 2, but differs in that the method of applying ice removal fluid (113) is carried out using a mobile spray device (121) after the aircraft (100) is positioned at the aircraft stand (203) when the folding wing portion (103) is sufficiently retracted, after which the folding wing portion (103) is held, as shown, in an over-folded position (111) at the aircraft stand (203), which may be advantageous for the reasons previously described.

Although the invention has been described above with reference to one or more preferred examples of embodiments, it will be appreciated that various changes or modifications may be made without departing from the scope of the invention as defined in the appended claims.

Where the term 'upper' is used in the preceding description, the terms should be understood to be a relative term to indicate that portion of the wings (101) surface that is on the upper side of the wing (101) when it is in the unfolded position (107), and which becomes overfolded when the wing (101) is in the overfolded position (111).

Where the term "or" has been used in the preceding description, this term should be understood to mean "and/or", except where explicitly stated otherwise.

The invention claimed is:

1. Method of applying an ice-removal fluid to a folding wing aircraft, the method comprising:
   a) applying the ice-removal fluid to the folding wing portion;
   and
   b) holding the folding wing portion in an over-folded position once the ice-removal fluid has been applied.

2. Method of claim 1, wherein the step of applying ice-removal fluid is carried out when the folding wing portion is positioned in an unfolded position.

3. Method of claim 1, wherein the step of applying ice-removal fluid is carried out when the folding wing portion is positioned in an overfolded position.

4. Method of claim 1, wherein the step of applying ice-removal fluid is carried out when the folding wing portion is positioned between a fully unfolded position and an overfolded position.

5. Method of claim 1, wherein the angle between the folding wing portion and the fixed wing portion in the over-fold position is more than 90 degrees.

6. Method of operating an aircraft during ground based operations comprising the steps of:
   a) positioning the aircraft at an off-stand location and applying an ice-removal fluid to a folding wing portion of the aircraft in accordance with claim 1; and
   b) positioning the aircraft in at the aircraft stand once the ice removal fluid has been applied.

7. Method of operating an aircraft during ground based operations comprising the steps of:
   a) positioning the aircraft at an aircraft stand and applying an ice-removal fluid to a folding wing of the aircraft in accordance with claim 1;
   positioning the aircraft at an off-stand location once the ice removal fluid has been applied.

8. Method of claim 1, wherein the angle between the folding wing portion and the fixed wing portion in the over-fold position is at least 135 degrees.

* * * * *